(12) United States Patent
Lin

(10) Patent No.: US 6,683,841 B2
(45) Date of Patent: Jan. 27, 2004

(54) ANTI-FLUTTERING TRANSMISSION APPARATUS FOR CD-RW DRIVE HEAD

(75) Inventor: Ke Rong Lin, Taipei (TW)

(73) Assignee: Behavior Tech Computer Corporation, Taipei (TW)

(*) Notice: Subject to any disclaimer, the term of this patent is extended or adjusted under 35 U.S.C. 154(b) by 162 days.

(21) Appl. No.: 09/962,226

(22) Filed: Sep. 26, 2001

(65) Prior Publication Data

US 2003/0058778 A1 Mar. 27, 2003

(51) Int. Cl.[7] ................................................. G11B 5/55
(52) U.S. Cl. ...................................................... 369/247
(58) Field of Search ............................. 369/247, 13.11, 369/263, 258, 279; 260/250, 266.2, 266.6, 78.12, 266.8

(56) References Cited

U.S. PATENT DOCUMENTS

| | | | | | |
|---|---|---|---|---|---|
| 4,418,371 | A | * | 11/1983 | Menden .................... | 360/266.2 |
| 6,282,065 | B1 | * | 8/2001 | Inoue et al. ............. | 360/267.3 |
| 6,335,915 | B1 | * | 1/2002 | Uchiyama et al. .......... | 369/223 |
| 6,388,971 | B2 | * | 5/2002 | Fujisawa .................... | 369/75.2 |
| 6,414,933 | B1 | * | 7/2002 | Anada et al. ................ | 369/219 |
| 6,522,614 | B1 | * | 2/2003 | Kim ........................... | 369/77.1 |

* cited by examiner

Primary Examiner—Brian E. Miller
(74) Attorney, Agent, or Firm—Rosenberg, Klein & Lee

(57) ABSTRACT

An anti-fluttering transmission apparatus for CD-ROM drive head, which is applied to drive a CD-ROM drive head to move back and forth between a transmission bar and a slide base, is provided. The anti-fluttering transmission apparatus comprises a connection base. The connection base has a fixing end for fixing the connection base on the slide base. From the fixing end extends a connection arm to an upside down L-shaped base on one end. A plurality of arc-raised teeth are formed on an internal y-axis surface of the L-shaped base. At least one spring is arranged between the fixing end and the L-shaped base. When assembling, the x-axis surface of the upper part of the L-shaped base stops on an upper part of the transmission bar. Each arc-raised tooth matches with a thread on the transmission bar. By the tension force of the spring, the arc-raised teeth can remain fixed and matched on the transmission bar for avoiding fluttering.

5 Claims, 4 Drawing Sheets

ANTI-FLUTTERING TRANSMISSION APPARATUS FOR CD-RW DRIVE HEAD

BACKGROUND OF THE INVENTION

1. Field of the Invention

The present invention relates to an anti-fluttering transmission apparatus for a CD-RW drive head having a connection base that provides an elastic pressing force between a CD-RW drive head slide base and a transmission bar to inhibit fluttering.

2. Description of the Prior Art

A CD-ROM drive is prevalent in audio and video equipment for reading diagrams, documents, audio, video, and images in media such as CD-ROM, DVD, CD-R, CD-RW, etc.

Reading speed is a top priority for a CD-ROM drive, but the precision of reading and writing is another matter of priority. For increasing searching speed by a CD-RW drive head of a CD, the approach of most prior arts devices is to design a slide base matched to a transmission bar so as to be driven by a motor and the transmission bar. The transmission bar is rotated for driving the slide base for fast moving of the CD-RW drive head back and forth, thus executing searching on the CD surface. A problem of such traditional transmission design is that a fluttering phenomenon often occurs because of the transmission bar rotating in two totally different directions. The fluttering causes CD-RW head vibration and searching misses, affecting stability and precision.

Another known design is that of a driving gear touched on a side of a transmission bar, and slide base of a CD-RW drive head being driven back and forth based on the transmission bar's rotation. The structure of this side touching causes reading and writing mistakes because of insufficient matching.

SUMMARY OF THE INVENTION

An objective of the present invention is to provide an anti-fluttering transmission apparatus for a CD-RW drive head having a connection base that provides an elastic pressing force set between a CD-RW drive head slide base and a transmission bar. An arc-raised tooth provided on the connection base can be fixed and matched on the transmission bar by elastic pressing for avoiding fluttering. The present invention promotes precision in the transmission of the CD-RW drive head.

According to the present invention, an anti-fluttering transmission apparatus is set inside a CD ROM drive for driving a CD-RW drive head. There is a connection base installed between a transmission bar and a slide base, The connection base includes a fixing end for fixing the connection base on the slide base. From the fixing end extends a connection arm to an L-shaped base at one end. A y-axis surface of the L-shaped base is formed with an arc-raised tooth. An x-axis surface of the L-shaped base stops on an upper part of the transmission bar when assembled. The arc-raised tooth matches with threads on the transmission bar. Further, there is at least one spring set between the fixing end, beneath the connection arm, and the L-shaped base. Via tension force of the spring, the arc-raised tooth can be fixed and matched on the transmission bar by elastic pressing to inhibit fluttering.

DETAILED DESCRIPTION OF THE INVENTION

Figure 1:
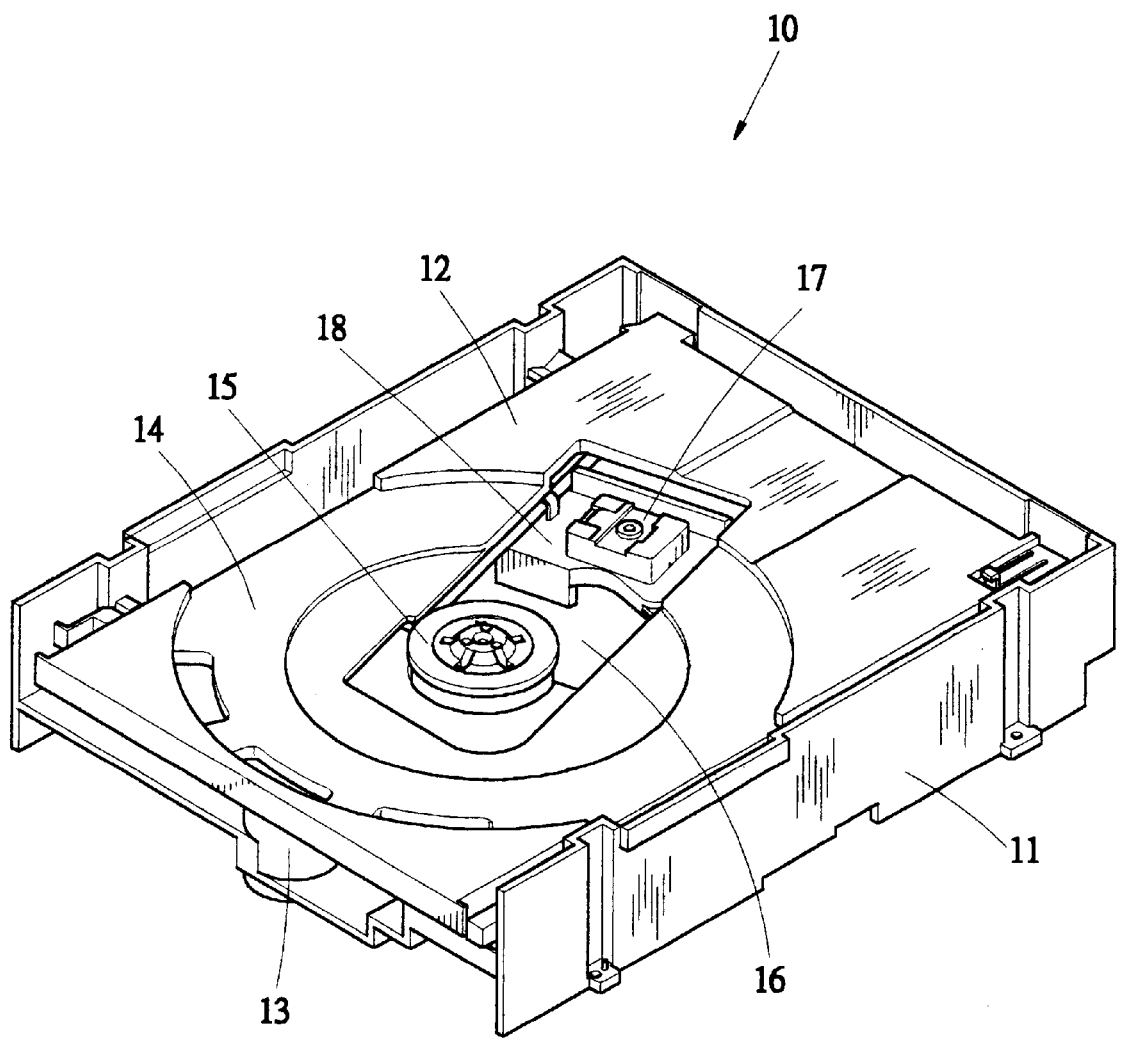
FIG. 1 is a perspective view of a CD-ROM drive body.
Figure 2:
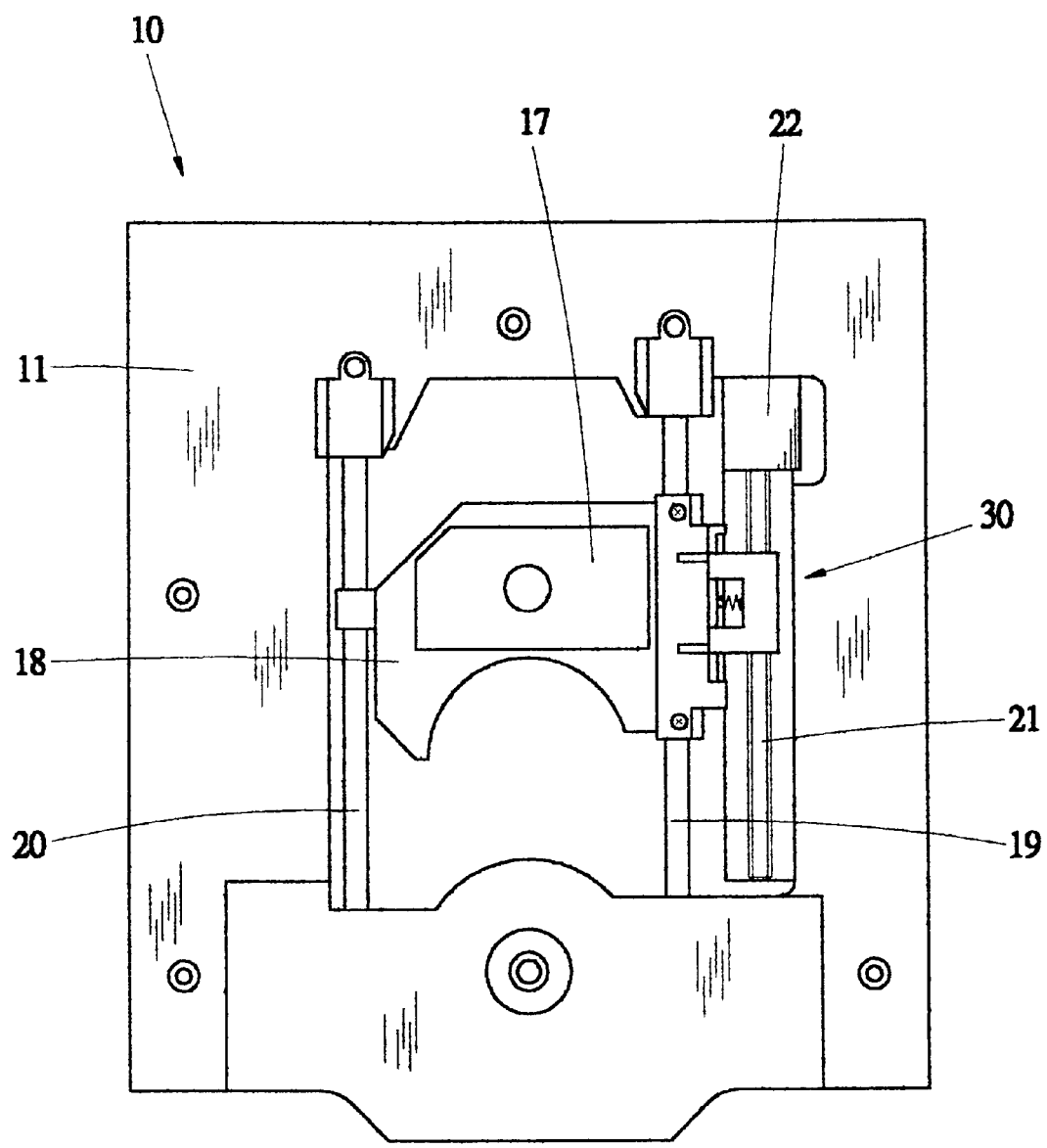
FIG. 2 is a plan view of the CD-ROM drive, showing an anti-fluttering transmission apparatus for CD-RW drive head of the present invention.
Figure 3:
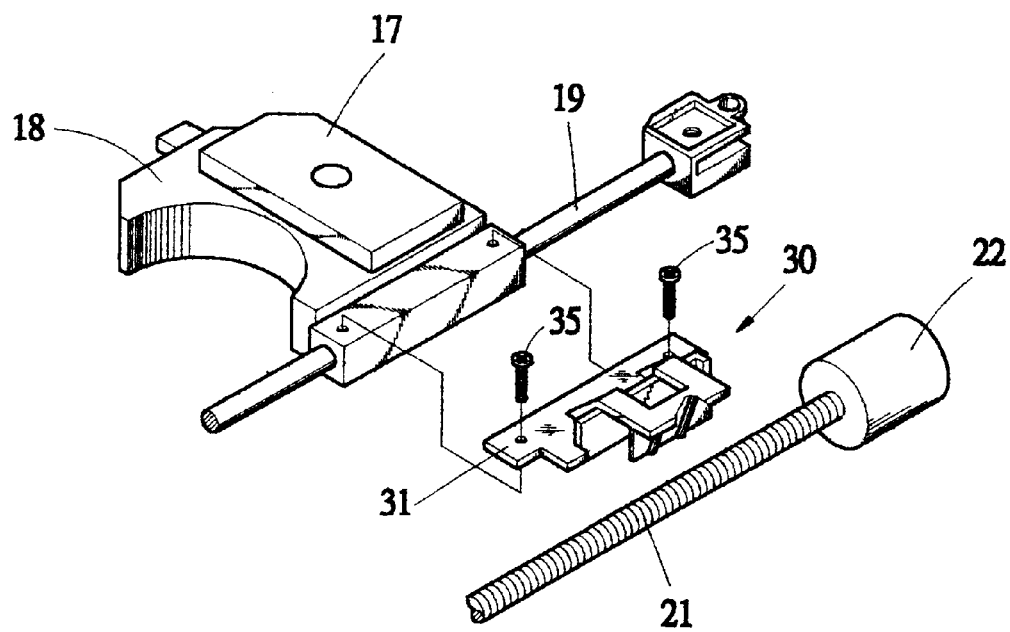
FIG. 3 is an exploded view of the anti-fluttering transmission apparatus for CD-RW drive head of the present invention.
Figure 4:
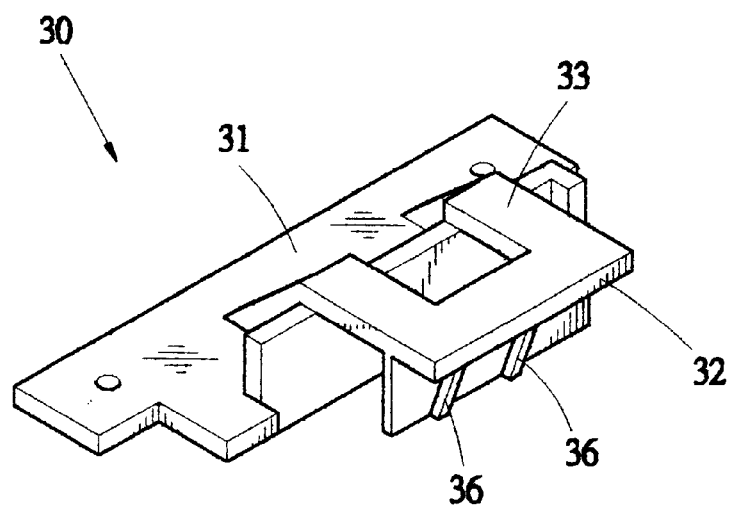
FIG. 4 is an enlarged view showing the connection base of the anti-fluttering transmission apparatus.
Figure 5:
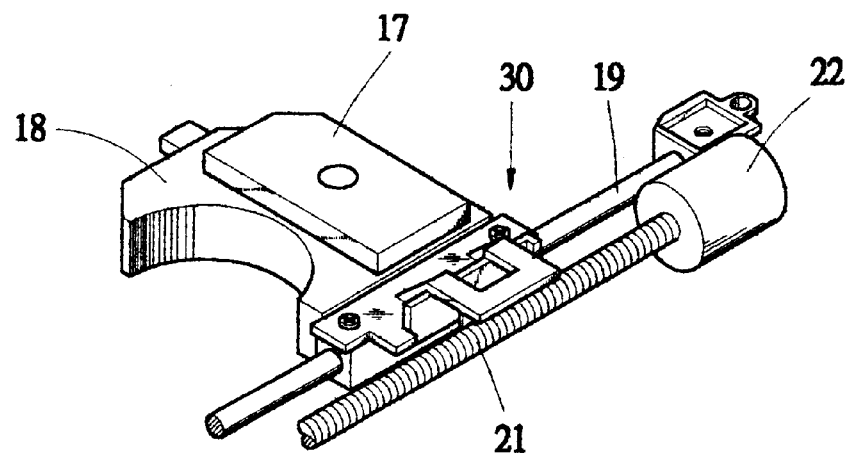
FIG. 5 is a perspective view of the anti-fluttering transmission apparatus.
Figure 6:
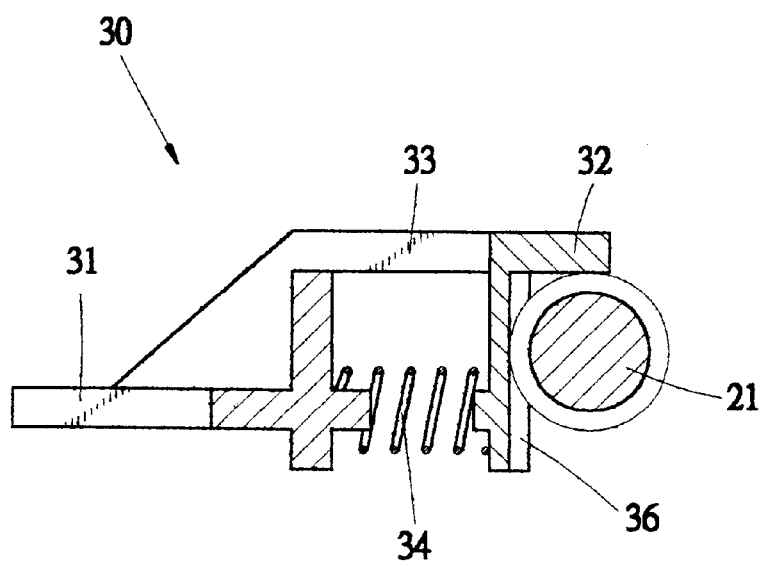
FIG. 6 is a cross-sectional view showing a connection of the anti-fluttering transmission apparatus.

Referring to FIGS. 1 and 2, the anti-fluttering transmission apparatus for CD-RW drive head of the present invention is arranged within an inside body 11 of a CD-ROM drive 10 for operation with a driving head 17. The drive head 17 moves between transmission bar 21 and slide base 18, A connection base 30 is installed between transmission bar 21 and slide base 18, and has elastic pressing force applied on transmission bar 21.

As shown in FIG. 1, the inside body 11 of the CD-ROM drive 10 comprises a tray 12 with telescopic function for loading CD. The tray 12 drives the body 11 for internally telescopic movement via a first motor 13. There is a concave portion 14 on tray 12 for receiving a CD. A second motor 15 is arranged on a central axis of the concave portion 14 and extends from an inclined slot 16 of concave portion 14 for rotating the CD. The inclined slot 16 is formed on the concave portion 14. The head 17 and the slide base 18 move along within the slot 16 for reading and writing information on the CD surface.

FIG. 2 is a bottom view of the CD-ROM drive 10 showing the anti-fluttering transmission apparatus arranged between the slide base 18 and the transmission bar 21.

As showing in the figure, the slide base 18 is set between two slide bars 19 and 20 on the inside body 11, The anti-fluttering transmission apparatus comprises a connection base 30 fixed On one side of slide base 18. The connection base 30 touches and matches with the transmission bar 21. The transmission bar 21 is rotatable in two different directions about its axis by a third motor 22. Along the two slide bars 19 and 20 the connection base 30 drives slide base 18 to move back and forth, so that the head 17 on slide base 18 can read and write information.

Referring to FIGS. 3 to 6, the connection base 30 has a fixing end 31 fixed on slide base 18 by a pair of screw bars 35. From an upper part of the fixing end 31 extends a connection arm 33. An L-shaped base 32 is placed upside down and connects with an end of the connection arm 33. A plurality of arc-raised teeth 36 are formed on an internal side of the L-shaped base 32. At least one spring 34 is arranged between the fixing end 31, beneath the connection arm 33, and the L-shaped base 32.

When assembling, the L-shaped base 32 stops on the upper part of the transmission bar 21. Each arc-raised tooth 36 matches with a thread on transmission bar 21. Further, the arc-raised tooth 36 are fixed and matched on the transmission bar 21 by the tension force of the spring 34 for avoiding fluttering. When the third motor 22 rotates transmission bar 21, this pressing is maintained for avoiding fluttering.

When the third motor 22 rotates transmission bar 21 in two different directions about its axis, the arc raised teeth 36 remain engaged thereto. Consequently, the connection base 30 is matched with the transmission bar 21 by elastic touching force, and the slide base 18 drives the head 17 to move along the slide bars 19 and 20 back and forth. Head 17 then reads and writes information on the CD surface.

After assembling, an upper x-axis surface of L-shaped base 32 stops on an upper part of the transmission bar 21, the arc-raised teeth 36 formed on a y-axis surface of L-shaped base 32 then matches with the transmission bar 21; therefore; the present embodiment easily maintains its assembly.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An anti-fluttering transmission apparatus for displaceably supporting a disk drive head comprising:

(a) transmission and slide bars spaced one from the other;

(b) a slide base slidably coupled to said slide bar for supporting the disk drive head;

(c) a connection base coupled to extend from said slide base, said connection base including a fixing end portion and a substantially L-shaped base portion defectively suspended therefrom by a connecting arm portion;

said substantially L-shaped base portion defined by transversely disposed first and second surfaces, said first and second surfaces receiving at least a portion of said transmission bar therebetween, said first surface having formed thereon at least one arc-raised tooth engaging said transmission bar; and, (d) an elastic member disposed between said fixed end and substantially L-shaped base portions of said connection base, said elastic member resiliently biasing said substantially L-shaped base portion against the deflection thereof relative to said fixed end portion.

2. The anti-fluttering transmission apparatus as recited in claim 1 wherein said elastic member includes a spring disposed to resiliently bias said substantially L-shaped base portion away from said fixed end portion.

3. The anti-fluttering transmission apparatus as recited in claim 1 wherein said fixed end portion of said connection base is detachably coupled to said slide base by a plurality of screw fasteners.

4. The anti-fluttering transmission apparatus as recited in claim 1 wherein said first and second surfaces of said substantially L-shaped portion are normally disposed one relative to the other, said second surface extending over at least a portion of said transmission bar, said first surface including a plurality of said arc-raised teeth formed to protrude therefrom.

5. The anti-fluttering transmission apparatus as recited in claim 4 wherein said second surface forms a stop surface bearing against said transmission bar.

* * * * *